July 3, 1928.
R. GOLDSCHMIDT
1,675,799
MECHANISM FOR MEASURING THE FREQUENCY OF THE PULSE
Filed Jan. 7, 1926
2 Sheets-Sheet 1
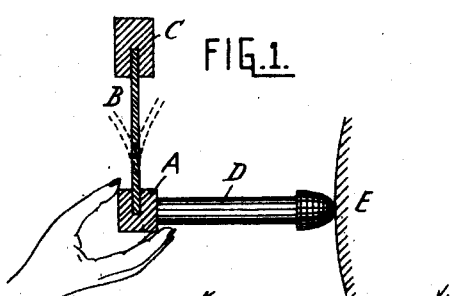
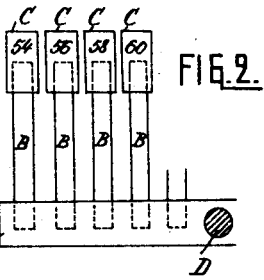
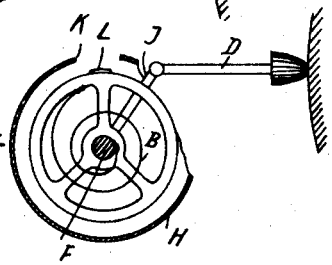
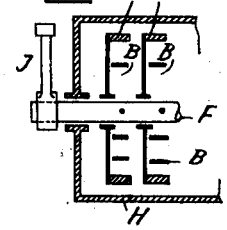
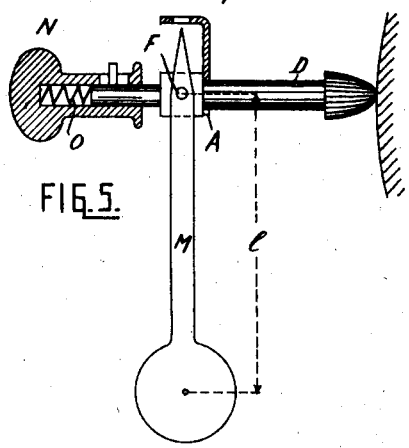
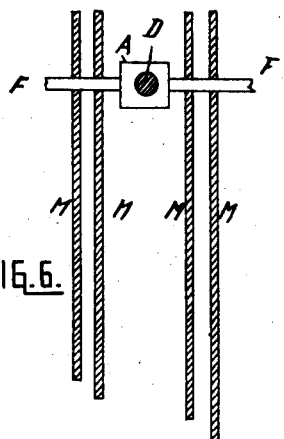
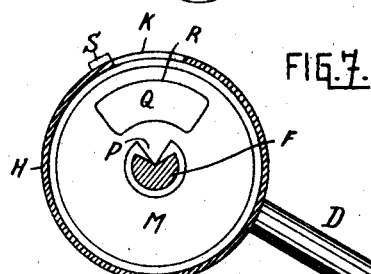
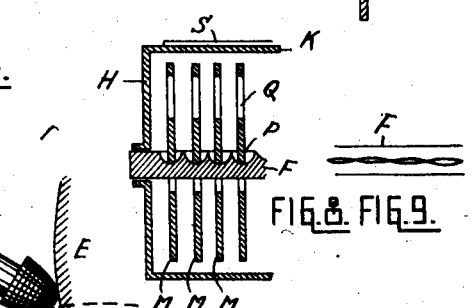
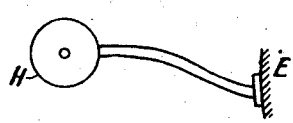

July 3, 1928. 1,675,799
R. GOLDSCHMIDT
MECHANISM FOR MEASURING THE FREQUENCY OF THE PULSE
Filed Jan. 7, 1926 2 Sheets-Sheet 2
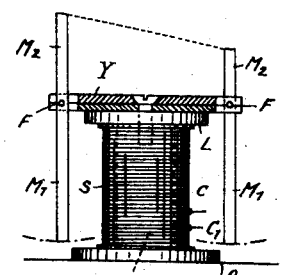
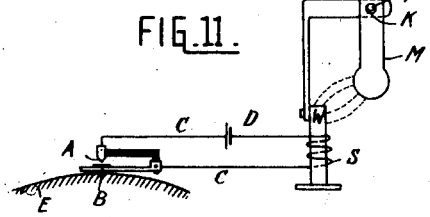
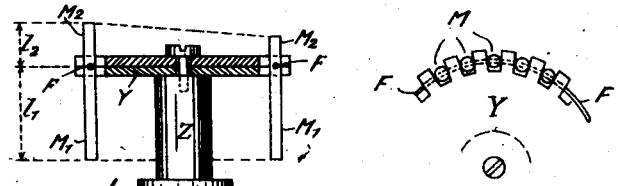
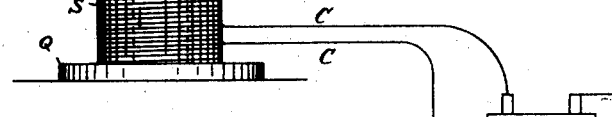
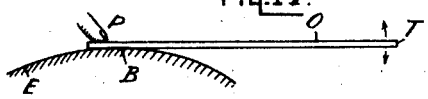
INVENTOR
Rudolf Goldschmidt,
BY Watson, Coit, Morse & Grindle
ATTYS Patented July 3, 1928.

1,675,799

UNITED STATES PATENT OFFICE.

RUDOLF GOLDSCHMIDT, OF CHARLOTTENBURG, BERLIN, GERMANY.

MECHANISM FOR MEASURING THE FREQUENCY OF THE PULSE.

Application filed January 7, 1926, Serial No. 79,880, and in Germany January 10, 1925.

It is customary to measure the pulse by counting the number of the beats during a minute or a shorter interval. In this fashion naturally only the average of the heart frequency can be ascertained. Now it is important to measure not only the average of the number of heart-beats per minute, but the beats during a comparatively very short interval.

It is the object of this invention to attain this purpose as nearly as possible and to measure the pulse frequency of a human being without counting and without measuring the time, in other words to produce a direct reading instrument for the frequency of the pulse. Such an instrument would enable one to observe also the change of frequency during a prolonged period and to measure its fluctuations as one measures the degree of uniformity of an engine. Such observations would permit to draw conclusions with regard to the general state of health, especially the strength of the heart, just as one observes the change of speed of an engine under different loads. One can make the patient do a certain amount of work, for instance rising and sitting down, lifting a weight or compressing a spring, and observe on the instrument directly the effect on the pulse.

In this invention, the resonance of oscillating bodies is utilized, its application to determine the pulse frequency being similar to the determination of sound frequencies in acoustics and to measuring the speed of machines with a resonance-speedometer.

In order that the invention may be more clearly understood, reference is hereinafter made to the accompanying drawings whereon:

Figs. 1 and 2 are of the mechanism in a primitive form, where the oscillating bodies consist of tongues, tuned to different frequencies.

Figs. 3 and 4 illustrate the form of the instrument, where the oscillating bodies consist of little fly-wheels and spiral springs similar to the balance of a watch.

In Figs. 5 and 6, the oscillating bodies have the form of gravity pendulums.

In Figs. 7, 8, and 9, a special form of gravity pendulums is shown.

Fig. 10 is a primitive diagrammatic plan of an arrangement to transmit pneumatically the power of the pulse to the indicating instrument.

Fig. 11 is a diagram for showing a method of transmitting the frequency of the pulse to the indicating apparatus and to actuate the oscillating bodies electro-magnetically.

Figs. 12 and 13 illustrate the construction of the indicating instrument, where the oscillating bodies are actuated by magnetism.

Figs. 14 and 15 are two different forms of an arrangement for magnifying the motion produced by the pulse.

Figure 16 is a plan view of the mechanism shown in the lower part of Figure 12 for varying the current flow in accordance with the pulse action.

Fig. 17 shows one view of a modified form of the arrangement of Fig. 12 the multiplying mechanism being omitted.

In Figs. 1 and 2, A is a beam, on which the tongues B are fastened. These tongues are carrying weights C by means of which they are tuned to the different pulse frequencies, say from 54-150 per minute. To transmit the oscillations caused by the pulse, from the human body E to the beam A a connecting rod D is used, which is fixed to the beam A. The connecting rod D is being pressed against the body with a slight pressure. The tongue which is in resonance with the pulse frequency will show the largest amplitude of oscillation. Naturally every tongue above and below the one which is in resonance, will take part in the oscillation to a certain degree. It is characteristic, however, for the working of the mechanism, that the tongues with a frequency below resonance and those above resonance vibrate with 180 degrees phase displacement which serves to read off the resonance frequency with a high degree of accuracy.

It is not absolutely necessary that the tongues B should be tuned to the exact frequency of the pulse, they can also be tuned to a multiple of this frequency, as the heart-beats are anything but a simple harmonic movement and contain higher harmonic vibrations of a comparatively large amplitude. A tongue tuned to a multiple of the fundamental frequency will respond also to the latter. It is also interesting to observe such higher harmonics of the pulse as indicative for disturbances of the heart.

In Figs. 3 and 4, H is a cylindrical casing, containing in its centre a shaft F which can be set in rotary oscillation by means of a crank J and the connecting rod D. Little fly-weights G are pivoted on shaft F and connected with this shaft by means of the spiral springs B. The casing H has a window K through which a mark L on the circumference of the wheels G can be observed. Close to the window K a scale is attached to the casing, on which the frequency of the wheel which is in resonance with the pulse, can be read off.

In Figs. 5 and 6, the oscillating bodies have the form of gravity pendulums, which appears to be the simplest, most rigid and most exact, its natural frequency being dependent on its geometrical dimensions only. With this species of the invention, no springs are required. Obviously springs which have frequencies as low as those of the human pulse must be long and thin and therefore comparatively sensitive and unreliable. The pendulums M are pivoted on the shaft F, the latter carrying the connecting rod D. A handle N with a spring O inside serve to hold the instrument.

The length $l$ of the pendulums for low frequencies is considerable, the length $l$ of a mathematical pendulum for a pulse, say of 54 cycles per minute being one foot. The total length of a physical pendulum is larger still. These dimensions become very cumbersome for such an instrument and therefore and for other purposes as mentioned below, a special shape is proposed as indicated in Figs. 7 and 8. The casing H has a cylindrical form and carries the beam F on which are the pendulums M in knife edge suspension.

Fig. 9 shows F in the ground plan indicating one particular form of the grooves for the knife edges P.

The shape of the pendulums M is circular and its diameter is comparatively very small, due to the pendulums consisting not only of a portion below the suspension line, the pendulum proper, but also of a counter-pendulum above the suspension line. The counter-pendulum balances part of the former by means of which the general dimensions are reduced to a fraction of the dimensions of the corresponding mathematical pendulum and which is very useful for tuning purposes by simply giving the hole Q different dimensions for different frequencies.

K is a window, S a scale, D a connecting rod to transmit the oscillations from the human body E to the pendulums.

Instead of carrying the indicating instrument close to the human body and transmitting the vibrations to this instrument by means of the connecting rod D the indicator can be placed on the table or on the wall and the vibrations can be transmitted by means of a flexible shaft or flexible tubes as already used by medical men for listening to the heart sounds.

Fig. 10 shows a primitive diagram for such an arrangement.

Preferable to this purely mechanical method of transmitting the heart frequency to the indicator is an electro-magnetical method, a diagrammatic view of which is Fig. 11. The pulse acts upon an electrical resistance which is dependent on the pressure exercised upon it (microphone), or it closes and opens a contact, the microphone and the make-and-break arrangement forming part of an electrical circuit.

One of the objects attained by the electromagnetical method is the independency of the power available for actuating the pendulums of the strength of the pulse, this power being derived from the source of electricity.

In Fig. 11, A is the contact, the make and break is being done by the pulse at B, E being the human body. C are conductors which lead over the electrical battery D to a coil S. This coil S is placed on an iron core W. W may consist of soft wrought iron or it may be hardened steel and form a permanent magnet like those in the telephone receiver. In the magnetic field of the core W are pendulums which are tuned to different pulse frequencies, and which are suspended on the shaft F. In Fig. 11 only one of these pendulums M is indicated, but there are about 30 of them in practically equal distance from the iron core. The pendulums consist of or contain iron or steel and can also be magnetized permanently to a certain degree. This permanent magnetism, however, must not be too strong, because otherwise neighboring pendulums repel one another too much and influence their proper working as well as their resonance frequency.

Instead of breaking the circuit, the arrangement may be modified by making the contact short circuit the whole or parts of coil S or a resistance in series with the coil S.

As seen from Fig. 11 the hole K is considerably larger than the diameter of the shaft F, the play in the bearing being about one tenth to one fifth of a millimeter with a diameter of the shaft F of about half a millimeter, i. e. about 20–40% of the shaft diameter. This unusual play is useful, because for small deflections the pendulum rolls on its shaft. This precaution is particularly useful, because the diameter of the shaft F must not be too small, in order to obtain proper damping of the pendulums, a wire with a diameter of half a millimeter being about the right size. I found that each pendulum ought to come to rest in less than 20 seconds after the actuating impulse ceases, if the amplitude of the deflection has been 45 degrees.

In Fig. 12, W is the iron or magnet steel core with the pole pieces Q and L. Round W is situated the magnetizing coil S. In a circle round the magnet are suspended the pendulums M. They are suspended on the shaft F by means of the support Y Z, the latter in this construction being preferably made out of non-magnetic material as brass or aluminum, as the distribution of the magnetic flux would be unfavorably influenced by an iron support. The pendulums as indicated by Figs. 12 and 13 have the form of a small circular wire with bearing holes (K in Fig. 11) drilled through at right angles to their axis. Preferably the length $l_1$ of the pendulums proper $M_1$ is kept constant, in order to make the distance of their ends from the magnet practically equal. The natural periodicity of each pendulum is regulated by the length $l_2$ of the counterpendulum $M_2$. The contact device shown in Figure 12 is explained in connection with Figure 16.

Fig. 17 is a slightly modified form of the arrangement of Fig. 12. It has the advantage over Fig. 12, that due to the almost closed magnetic circuit, the magnetizing power of the coil S required for actuating the pendulums, is very small.

In Figs. 14 and 15, the principle of multiplying the motion obtained by the pulse, is shown.

In Fig. 14, O is a lever, which is put across the limb where the pulse, at B, is to be measured. The lever O is pressed on by the finger at one end P and a considerable deflection is obtained at the other end T. After some practice deflections of T of five millimeters and more can be obtained at the wrist.

In Fig. 15, at the end P of the rod O is provided a journal and little weights R serve to exercise some pressure on the artery. If R is increased beyond a certain weight, the movement at the end T of the rod O will cease. The weight R required to stop this movement enables to measure the pressure of the blood.

In Fig. 16, a contact mechanism, shown in Figure 12 in elevation, is shown in plan. V is a rod which can be held in the hand or attached to the wrist by means of a more or less elastic ribbon X. Journalled on V by the pivot J is the lever U, the pivot J being as near as possible in the centre of gravity of U. In U is a slot N, of which one side, $N_1$, is insulated. A second rod O is pivotally connected to V. This is indicated by the rubber bandages G which allow a motion of O relative to V, when the pressure of the pulse is exercised at B. A projection I on O fits loosely in the slot N, preferably with a play of somewhat less than one tenth of a millimeter. When the projection touches the upper edge of N, an electrical contact is established between V and O. If I touches the lower edge $N_1$, the connection is broken. O and V are connected by means of the conductors C over the battery D to the coil S.

Due to the lever U being pivoted to V, O has a certain freedom of movement relative to V, U turning on its pivot. But the momentum of inertia of U is so considerable, that it offers sufficient resistance of inertia to the impulses caused by the pulse itself, so that a reliable make and break takes place between I and the upper edge of N.

I claim:

1. A resonance speedometer for measuring the frequency of the pulse consisting essentially of a series of oscillatory bodies capable of resonance and tuned in steps to the pulse frequency of humans and means to cause these bodies to oscillate under the influence of the pulse.

2. A resonance speedometer for measuring the frequency of the pulse consisting essentially of a series of gravity pendulums tuned in steps to the pulse frequencies of humans, all pendulums of the series having the same dimensions on one side of their supports but having different dimensions for each on the other side of their supports and means to cause these pendulums to oscillate under the influence of the pulse.

3. A resonance speedometer for measuring the frequency of the pulse consisting essentially of a series of gravity pendulums tuned in steps to the pulse frequencies of humans by means of balancing part of the pendulums in different degrees and means to cause these pendulums to oscillate under the influence of the pulse.

4. A resonance speedometer for measuring the frequency of the pulse consisting essentially of a series of gravity pendulums suspended on wires and means to cause these pendulums to oscillate under the influence of the pulse.

5. A resonance speedometer for measuring the frequency of the pulse consisting essentially of a series of gravity pendulums suspended on wires, the diameter of these wires being such as to cause friction to such a degree, that the oscillations are damped in less than twenty seconds, if the initial deflection has been 45 degrees and means to cause these pendulums to oscillate under the influence of the pulse.

6. A resonance speedometer for measuring the frequency of the pulse consisting essentially of a series of gravity pendulums suspended on wires, these wires passing through holes in the pendulums with a play of more than 10% of the diameter of the wire and means to cause these pendulums to oscillate under the influence of the pulse.

7. A resonance speedometer for measuring the frequency of the pulse consisting essentially of a series of oscillatory bodies capable of resonance and means including mechanical devices to cause these bodies to oscillate under the influence of the pulse.

8. A resonance speedometer for measuring the frequency of the pulse consisting essentially of a series of oscillatory bodies capable of resonance and means including mechanical devices to transmit the power of the pulse to the oscilatory bodies in order to cause them to oscillate under the influence of the pulse.

9. A resonance speedometer for measuring the frequency of the pulse consisting essentially of a series of oscillatory bodies capable of resonance and electro-magnetic means to cause these bodies to oscillate under the influence of the pulse.

10. A resonance speedometer for measuring the frequency of the pulse consisting essentially of a series of pendulums containing iron and suspended in the vicinity of a wire bobbin, this bobbin being connected to a source of electricity and a make-and-break arrangement, the latter being actuated by the pulse.

11. A resonance speedomter for measuring the frequency of the pulse consisting essentially of a series of pendulums containing iron and suspended in the vicinity of a wire bobbin, this bobbin being connected to a source of electricity and to means for altering the current strength of the circuit by the pulse.

12. A resonance speedometer for measuring the frequency of the pulse consisting essentially of a series of pendulums containing iron and suspended in the vicinity of a wire bobbin, this bobbin being connected to a source of electricity and means for altering the current strength of the circuit by the pluse, the pendulums being permanently magnetized.

13. A resonance speedometer for measuring the frequency of the pulse consisting essentially of a series of pendulums containing iron and suspended in the vicinity of a wire bobbin, this bobbin being connected to a source of electricity, the current being governed by the pulse and the bobbin containing an iron core.

14. A resonance speedometer for measuring the frequency of the pulse consisting essentially of a series of pendulums containing iron and suspended in the vicinity of a wire bobbin, this bobbin being connected to a source of electricity, the current being governed by the pulse and the bobbin containing a core of steel permanently magnetized.

15. A resonance speedometer for measuring the frequency of the pulse consisting essentially of a series of pendulums containing iron and suspended opposite to a pole of an iron core, the core carrying a wire bobbin, this bobbin being connected to a source of electricity and to means for altering the resistance of the circuit by the pulse, the pendulums being suspended in a circle round the core.

16. A resonance speedometer for measuring the frequency of the pulse consisting essentially of a series of pendulums containing iron and suspended opposite to a pole of an iron core, the core carrying a wire bobbin, this bobbin being connected to means for altering the current strength of the circuit by the pulse, the suspensions of the pendulums relative to a pole of the core being such that the end of the pendulums during their oscillations pass opposite the edge of a pole-piece of the core.

17. A resonance speedometer for measuring the frequency of the pulse consisting essentially of a series of pendulums containing iron and suspended opposite to a pole of an iron core, the core carrying a wire bobbin, this bobbin being connected to a make-and-break arrangement, the latter being actuated by means of a lever which is set in motion by the pulse and making contact with a second lever, both these levers being insulated from one another and connected to the circuit of the bobbin on the core.

18. A resonance speedometer for measuring the frequency of the pulse consisting essentially of a series of pendulums containing iron and suspended opposite to a pole of an iron core, the core carrying a wire bobbin, this bobbin being connected to a make-and-break arrangement, the latter being actuated by means of a lever which is set in motion by the pulse and making contact with a second lever, both these levers being insulated from one another and connected to the circuit of the bobbin on the core, the second lever carrying pivotally a third lever, suspended in a pivot as near as possible to its centre of gravity, the make-and-break taking place between the first lever and the third.

19. Indicator for low frequencies consisting essentially of a series of compound gravity pendulums tuned in steps within the range of frequencies to be measured and means to impart impulses to these pendulums, all pendulums of the series having the same dimensions on one side of their supports but having different dimensions for each on the other side of their supports.

In testimony whereof I affix my signature.

RUDOLF GOLDSCHMIDT.